US007171233B2

(12) United States Patent
Sanchez

(10) Patent No.: US 7,171,233 B2
(45) Date of Patent: Jan. 30, 2007

(54) METHOD AND DEVICE FOR SELECTING BETWEEN TELECOMMUNICATION NETWORKS

(75) Inventor: Javier Sanchez, Rueil-Malmaison (FR)

(73) Assignee: NEC Corporation, Tokyo (JP)

(*) Notice: Subject to any disclaimer, the term of this patent is extended or adjusted under 35 U.S.C. 154(b) by 558 days.

(21) Appl. No.: 10/625,530

(22) Filed: Jul. 24, 2003

(65) Prior Publication Data

US 2004/0110531 A1 Jun. 10, 2004

(30) Foreign Application Priority Data

Jul. 25, 2002 (FR) .................. 02 09428

(51) Int. Cl.
*H04Q 7/20* (2006.01)
(52) U.S. Cl. ............... 455/552.1; 455/41.2; 455/456.1; 455/517; 455/426.1; 455/421; 455/440; 455/445; 370/338
(58) Field of Classification Search ......... 455/552.1, 455/553.1, 41.2, 41.3, 456.1–456.6, 517–519, 455/426.1, 421, 445, 440; 370/328, 338, 370/465
See application file for complete search history.

(56) References Cited

U.S. PATENT DOCUMENTS

| 5,666,661 | A | * | 9/1997 | Grube et al. ............ 455/517 X |
| 5,995,500 | A | * | 11/1999 | Ma et al. .................... 370/337 |
| 6,484,027 | B1 | * | 11/2002 | Mauney et al. ............. 455/421 |
| 2004/0266457 | A1 | * | 12/2004 | Dupray ................... 455/456.5 |
| 2005/0159179 | A1 | * | 7/2005 | Sainton et al. ........... 455/552.1 |

* cited by examiner

Primary Examiner—Matthew D. Anderson
Assistant Examiner—Philip J. Sobutka
(74) Attorney, Agent, or Firm—Sughrue Mion, PLLC

(57) ABSTRACT

A method of selecting between telecommunication networks for at least two terminals capable of exchanging data in a first frequency band of a first telecommunication network with subscription and in a second frequency band of a second telecommunication network without subscription includes the steps of: estimating the relative distance between the two terminals; and switching the operation frequency of each of these two terminals from the first frequency band to the second frequency band if the distance between the two terminals is smaller than a predetermined value.

11 Claims, 3 Drawing Sheets

METHOD AND DEVICE FOR SELECTING BETWEEN TELECOMMUNICATION NETWORKS

BACKGROUND OF THE INVENTION

1. Field of the Invention

The invention is in the field of telecommunication, and it relates to a method and a device for allowing a mobile terminal to select between at least two radio access technologies: one technology providing access to a cellular telephone network, and another allowing access to an alternative network when it is shown that the recipient of a call is located close to the caller. More specifically, the invention relates to a method of selecting between telecommunication networks for at least two terminals capable of exchanging data in a first frequency band of a first telecommunication network with subscription and in a second frequency band of a second telecommunication network without subscription.

2. Description of the Related Art

Currently, two persons having a subscription with a cellular telephone carrier have to use their telephone service to make calls even when the distance that separates them is relatively short, for example a few dozen meters. This situation can take place in a railway station, on streets, or in an office building. However, there are gratuitous radio bands such as for example 2.4 GHz ISM (Industrial Scientific and Medical) band, which may be used within a limited geographical zone. These frequency bands generally requires a specific modem such as Bluetooth or Wi-Fi (Wireless Fidelity) modem characterized by their simplicity, low cost, and low energy consumption.

SUMMARY OF THE INVENTION

Therefore, an object of the invention is to allow subscribers of a telecommunication network to use these alternative networks in limited zones such as for example within a company. In this way, economies in the communication costs may be achieved for the communication being made, especially when the volume of information to be exchanged is significant.

The invention proposes a method of selecting between telecommunication networks for at least two terminals capable of exchanging data in a first frequency band of a first telecommunication network with subscription and in a second frequency band of a second telecommunication network without subscription.

The method according to the invention comprises the steps of:

estimating the relative distance between two terminals; and switching the operation frequency of each of these two terminals from the first frequency band to the second frequency band if the distance between the two terminals is smaller than a predetermined value R.

Preferably, the switching to the second network also depends on the QoS (Quality of Service) assured by this second network.

According to one embodiment of the invention, the estimating of the distance between the two terminals is performed by the network.

According to another embodiment of the invention, the estimating of the distance between the two terminals is achieved by the calling terminal according to the following steps:

The calling terminal receives its own geographical position $P_A$ and the geographical position $P_B$ of the called terminal from the network; and This calling terminal calculates the distance that separates it from the called terminal from the positions $P_A$ and $P_B$.

According to a third embodiment of the invention, the estimating of the distance between the two terminals is achieved by the calling terminal according to the following steps:

the called terminal requests its own geographical position $P_B$ from the network and transmits position $P_B$ to the calling terminal; and the calling terminal requests its own geographical position $P_A$ from the network and calculates the distance that separates the calling terminal from the called terminal according to $P_A$ and $P_B$.

The first network is either a UMTS (Universal Mobile Telecommunications System) network or a GSM (Global System for Mobile Communications) network, for example. The second network is one of Bluetooth, Wi-Fi and DECT (Digital European Cordless Telephone) networks, for example.

The invention also relates to a device for selecting the operation frequency of at least two terminals, each comprising a radio access module for communicating in a first frequency band of a first telecommunication network with subscription and in a second frequency band of a second telecommunication network without subscription.

The device according to the invention comprises:

means for estimating the relative distance between two terminals; and means for switching the operation frequency of each of these two terminals from the first frequency band to the second frequency band if the distance between the two terminals is smaller than the radius R of the coverage of the second network.

Preferably, the device according to the invention comprises means for calculating the distance between the two terminals according to the spatial coordinates of the terminals.

The invention also relates to a mobile communication terminal comprising a radio access module for communicating with at least a second terminal in a first frequency band of a first telecommunication network with subscription and in a second frequency band of a second telecommunication network without subscription.

The terminal according to the invention comprises a network selection module suitable for estimating the distance between the mobile terminal and the second terminal and for switching the operation frequency of said first terminal from the first frequency band to the second frequency band if the distance between the two terminals is smaller than the radius R of the coverage of the second network.

In the present invention, since the second telecommunication network without subscription is selected instead of the first telecommunication network with subscription if the distance between the interlocutors is small, the communication costs between the interlocutors are remarkably reduced.

The above and other objects, features, and advantages of the present invention will become apparent from the following description with reference to the accompanying drawings which illustrate an example of the present invention.

DETAILED DESCRIPTION OF THE INVENTION

In the following description, the terminals under consideration are mobile telephones whose hardware architecture conforms to a cellular telephony standard, for example GSM or UMTS. However, the invention can be applied to any user equipment (UE) capable of exchanging data.

Figure 1:
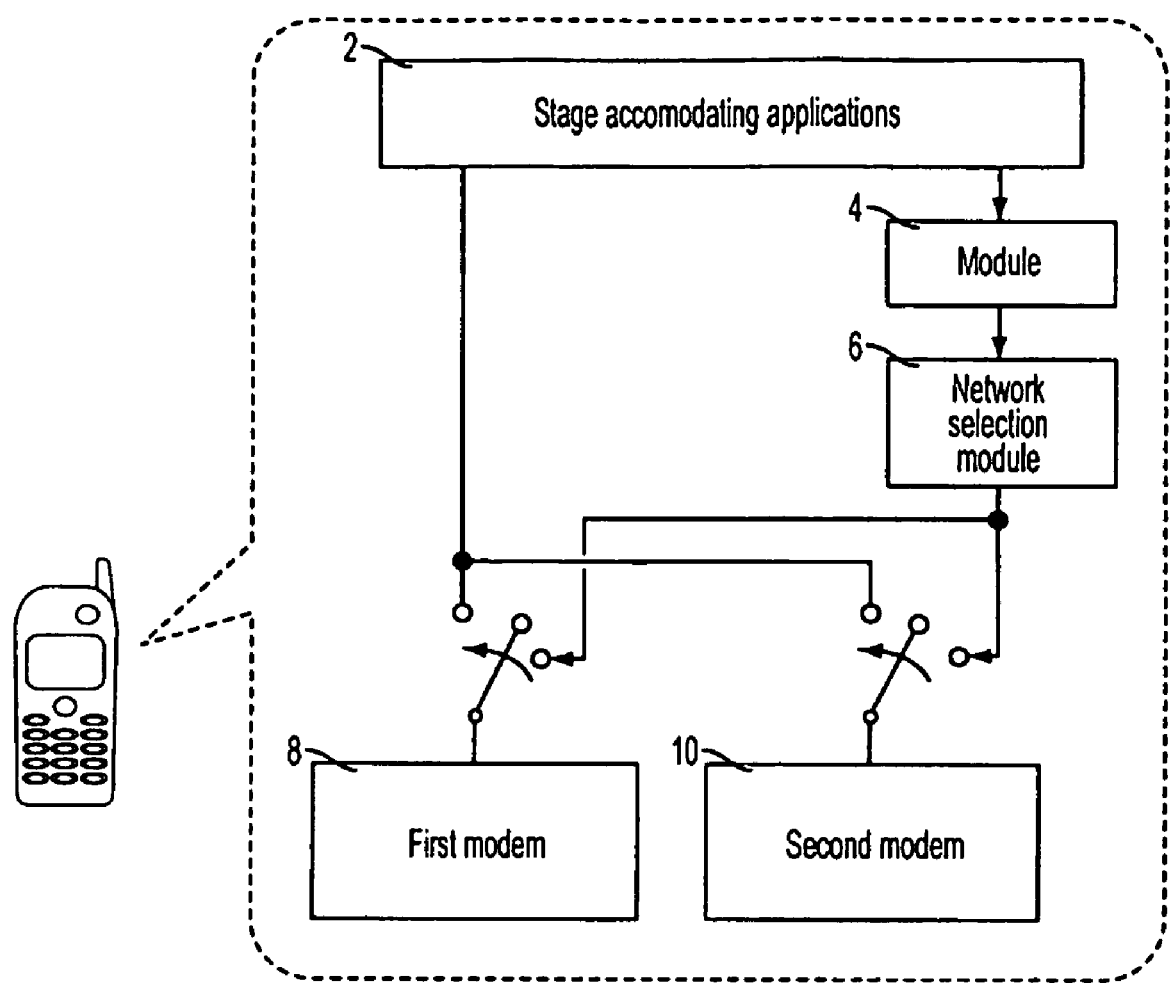
FIG. 1 is a block diagram illustrating a mobile terminal comprising a device according to the invention.

As can be seen in FIG. 1, these telephones comprise a stage 2 accommodating a plurality of applications that may be activated by a user from a presentation menu, a module 4 for handling call requests coming from the stage 2, a network selection module 6, a first modem 8 allowing access to a first frequency band of a first telecommunication network with subscription which is a GSM or UMTS network, and a second modem 10 allowing access to a second frequency band of a second telecommunication network without subscription. The second frequency band is preferably a free or gratuitous radio band such as 2.4 GHz ISM band.

Figure 2:
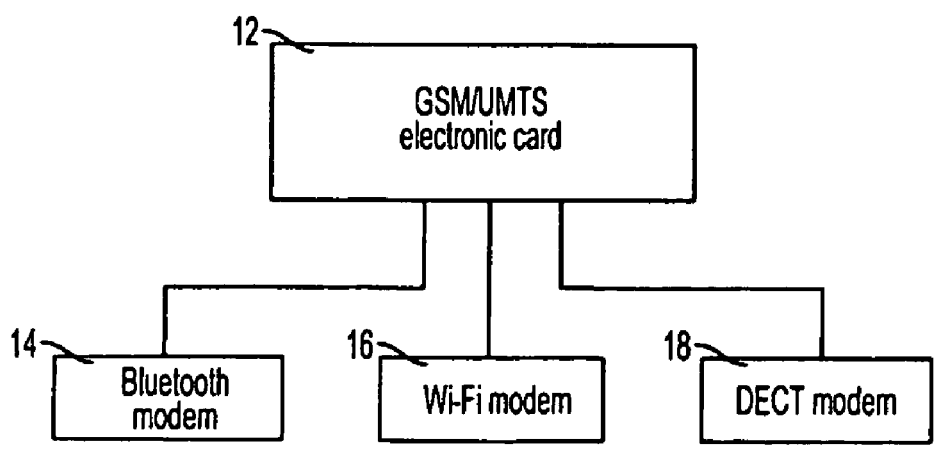
FIG. 2 shows a block diagram illustrating an architecture of the terminal of FIG. 1 in a particular embodiment of the invention.

FIG. 2 schematically illustrates one embodiment of an architecture in which the second modem 10 appears as an application to the GSM/UMTS electronic card 12.

With reference to FIG. 2, the electronic card 12 supporting the GSM/UMTS access networks is connected, via an interface, to a Bluetooth modem 14, a Wi-Fi modem 16, and a DECT modem 18 respectively. These modems remain inactive so long as the GSM/UMTS electronic card 12 is active.

In another embodiment (not shown), the modems 14, 16, and 18 share with the electronic card 12 electronic components such as a microprocessor, a memory, and a radio frequency section.

Figure 3:
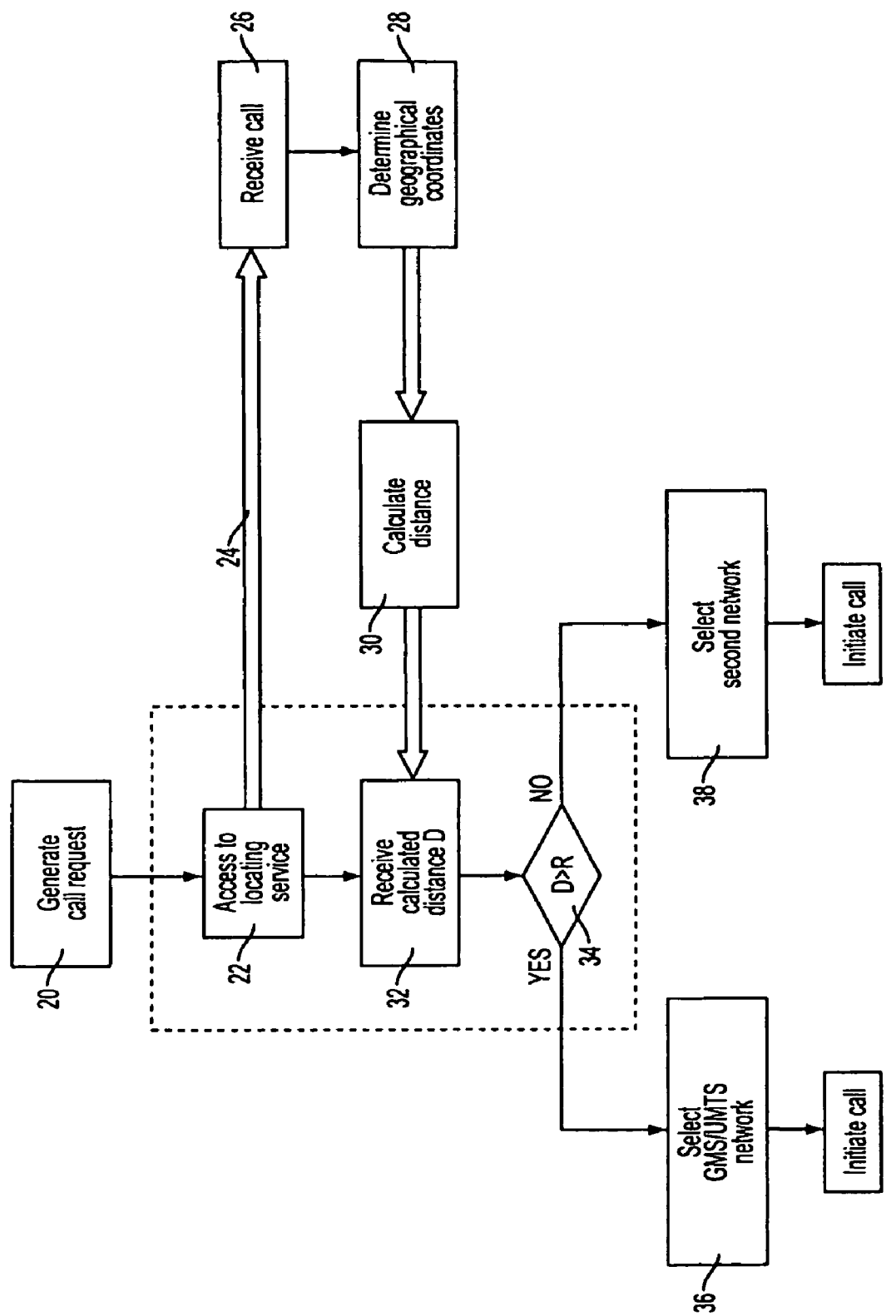
FIG. 3 is a flowchart illustrating a first embodiment of the method according to the invention.

FIG. 3 is a flowchart schematically illustrating the functional role of the network selection module 6. This module comprises a software program allowing the following tasks to be performed:

1) When a caller terminal A wants to establish communication with a recipient terminal B, a call request is generated at the stage 2 at step 20, and then transmitted to the module 4 for handling call requests.

2) The software program generates a request, at step 22, to access a locating service being subscribed with by at least one of the two parties in communication. This request is transmitted at step 24 to the GSM/UMTS cellular network that provides a service of locating subscribers.

3) Upon receiving this call at step 26, this locating service determines, at step 28, the geographical coordinates of the terminals A and B and calculates, at step 30, the distance D that separates the two terminals A and B. At step 32, the caller A receives the calculated distance D and compares, at step 34, the distance D with the value R representing the coverage of the second network that may be as much as several dozen meters.

4) At this step, the network selection module 6 of the terminal A determines which frequency band is to be used for carrying out the next call in the following manner:

If the calculated distance D is greater than R, the module 6 selects the GSM/UMTS network at step 36;

If the calculated distance D is smaller than R, the module 6 selects the second network at step 38.

5) Once a telecommunication network is selected, the software program initiates a call according to the protocols associated with respective networks.

In a variant embodiment in which the terminal A knows a priori the position of the terminal B, the selection between telecommunication networks may be made manually.

Note that there is a great number of service providers that offer the possibility of finding out the distance that separates two mobile terminals in communication (see for example www.webraska.com and www.jlocationservices.com).

Figure 4:
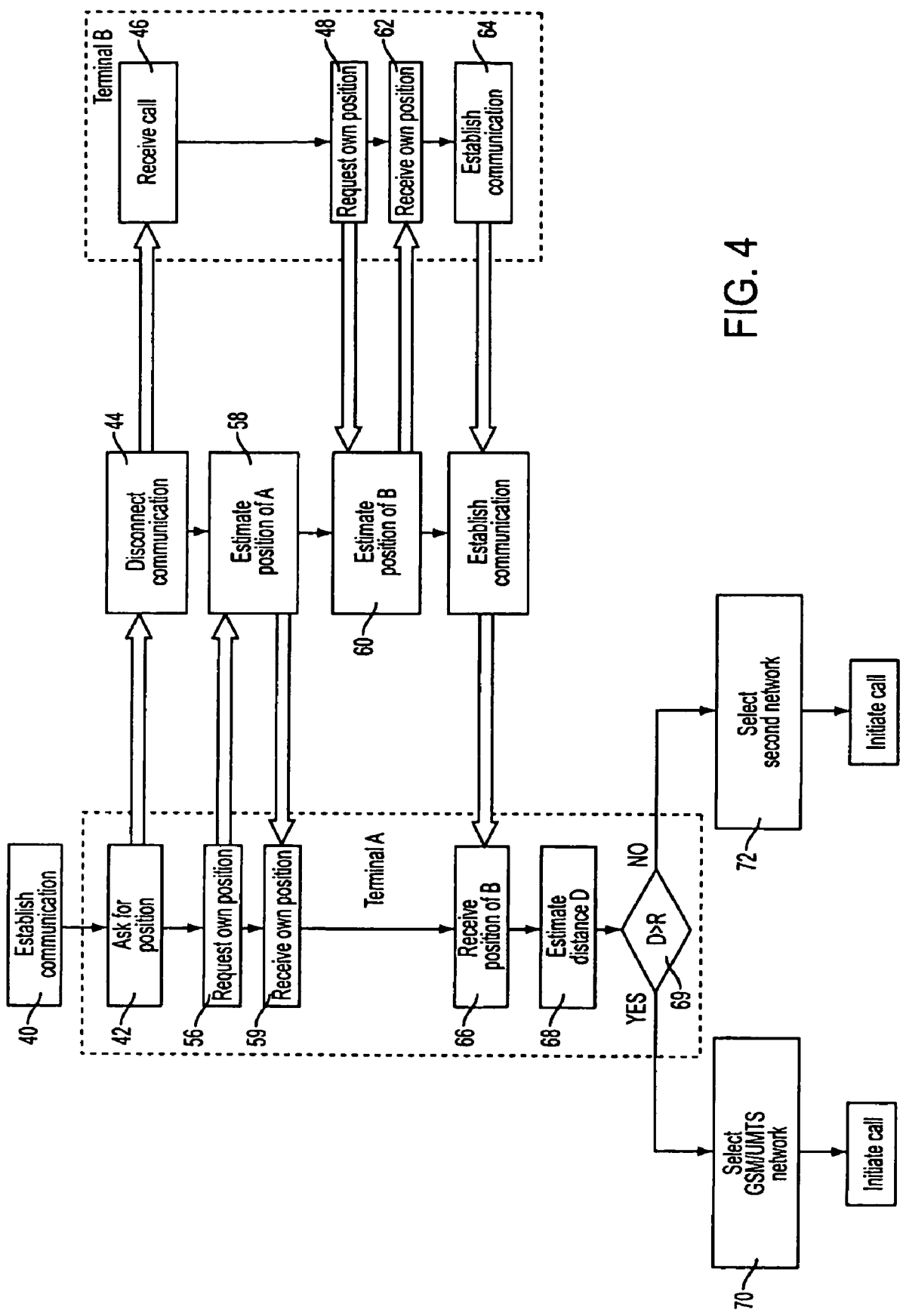
FIG. 4 is a flowchart illustrating a second embodiment of the method according to the invention.

FIG. 4 illustrates a second embodiment of the method of the invention in which the network carrier does not give the distance between terminals, giving only the coordinates of the caller.

In this case, the terminal A establishes communication with the terminal B at step 40 via the UMTS/GSM network and requests the terminal B to ask for own position of the terminal B at step 42, and then disconnects the communication at step 44.

Upon receiving the call from the terminal A at step 46, the terminal B requests its own position from the network 6 at step 48. Simultaneously, the terminal A requests its own position from the network at step 56. The network estimates the position of the terminal A at step 58 and transmits the estimated position to the terminal A, which receives the position at step 59. Then the network estimates the position of the terminal B at step 60 and transmits it to the terminal B. Upon receiving its own position at step 62 the terminal B establishes communication with the terminal A at step 64 via the UMTS/GSM network and provides the position of the terminal B to the terminal A, which receives it at step 66.

Estimating the distance from the positions of the terminals A and B:

With the positions given by the geographical coordinates of terminals A and B, the mobile terminal A can estimate, at step 68, the distance D that separates the terminal A from the terminal B according to a digitized electronic map stored formerly in the memory of the terminal A. It is only necessary then to locate the users in this map in order to determine the distance by means of an appropriate software program.

The determined distance D is compared with the value R at step 69:

If the estimated distance D is greater than value R, the module 6 selects the GSM/UMTS network at step 70; and If the calculated distance D is smaller than value R, the module 6 selects the second network at step 72.

Once a telecommunication network is selected, the software program initiates a call according to the protocols associated with respective networks.

What is claimed is:

1. A method of selecting a network between telecommunication networks for two terminals capable of exchanging data in a first frequency band of a first telecommunication network with subscription and in a second frequency band of a second telecommunication network without subscription, comprising:

estimating a distance between the two terminals; and switching an operation frequency of each of the two terminals from the first frequency band to the second frequency band if the distance between the two terminals is smaller than a predetermined value, wherein the estimating of the distance between the two terminals comprises:

receiving from one of the telecommunication networks, by a first one of the two terminals, its own geographical position $P_A$ and a geographical position $P_B$ of the second one of the two terminals determined by one of the telecommunication networks; and calculating, by the first one of the two terminals, the distance that separates the first one of the two terminals from the second one of the two terminals from the geographical positions $P_A$ and the geographical position $P_B$.

2. The method according to claim 1, wherein the predetermined value represents a radius of coverage of the second telecommunication network.

3. The method according to claim 2, wherein the switching to the second telecommunication network depends on QoS assured by the second telecommunication network.

4. The method according to claim 1, wherein the estimating of the distance between the two terminals is performed by the telecommunication network.

5. The method according to claim 4, wherein said telecommunication network used in the estimating of the distance is the first telecommunication network.

6. The method according to claim 1, further comprising: requesting, by the second one of the two terminals, its own position $P_B$ from one of the telecommunication networks and transmitting the geographical position $P_B$ to the first one of the two terminals.

7. The method according to claim 6, wherein the one of the telecommunication networks that determines the geographical position $P_A$ and the geographical position $P_B$ is the first telecommunication network.

8. The method according to claims 1, wherein the first telecommunication network is either a UMTS network or a GSM network, and wherein the second telecommunication network is one of Bluetooth, Wi-Fi, and DECT networks.

9. A device for selecting a network between telecommunication networks for at least two terminals, each comprising a radio access module for communicating in a first frequency band of a first telecommunication network with subscription and in a second frequency band of a second telecommunication network without subscription, said device comprising:

one of the telecommunications networks having means for determining geographical positions of the two terminals one of the two terminals having means for estimating a distance between two terminals based on the determined geographical positions obtained from said one of the telecommunication networks; and means for switching an operation frequency of each of the two terminals from the first frequency band to the second frequency band if the distance between the two terminals is smaller than a predetermined value.

10. The device according to claim 9, further comprising means for estimating the distance between the two terminals according to spatial coordinates of the two terminals.

11. A mobile communication terminal, comprising:

a radio access module that communicates with at least a second terminal in a first frequency band of a first telecommunication network with subscription and in a second frequency band of a second telecommunication network without subscription, and a network selection module that estimates a distance between the mobile terminal and the second terminal and for switching an operation frequency of said mobile terminal from the first frequency band to the second frequency band if the distance between the two terminals is smaller than a predetermined value, wherein the network selection module estimates the distance between the first mobile terminal and the second mobile terminal based on corresponding geographical positions of the first mobile terminal and the second mobile terminal as obtained from one of the first telecommunication network and the second telecommunication network.

* * * * *